United States Patent [19]
Laming et al.

[11] Patent Number: 5,579,153
[45] Date of Patent: Nov. 26, 1996

[54] OPTICAL POWER LIMITING AMPLIFIER

[75] Inventors: Richard I. Laming, Hamble; Michael N. Zervas, Bassett, both of Great Britain

[73] Assignee: Pirelli Cavi S.p.A., Italy

[21] Appl. No.: 52,244

[22] Filed: Apr. 22, 1993

[30] Foreign Application Priority Data

Apr. 27, 1992 [GB] Great Britain .................... 9209095

[51] Int. Cl.⁶ .................. H01C 3/06; G02B 6/26
[52] U.S. Cl. .................. 359/341; 359/134; 359/160
[58] Field of Search ........................... 359/124, 134, 359/337, 341, 160; 385/32

[56] References Cited

U.S. PATENT DOCUMENTS

| | | | |
|---|---|---|---|
| 5,117,303 | 5/1992 | Desurvire et al. | 359/337 |
| 5,131,069 | 7/1992 | Hall et al. | 385/142 |
| 5,155,621 | 10/1992 | Takeda et al. | 359/341 |
| 5,155,780 | 10/1992 | Zirngibi . | |
| 5,161,050 | 11/1992 | Grasso et al. | 359/341 |
| 5,177,634 | 1/1993 | Way . | |
| 5,233,463 | 8/1993 | Grasso et al. | 359/341 |

FOREIGN PATENT DOCUMENTS

| | | | |
|---|---|---|---|
| 0442553A1 | 8/1991 | European Pat. Off. | G02F 1/39 |
| 0470497A2 | 2/1992 | European Pat. Off. | H01S 3/06 |

OTHER PUBLICATIONS

Graydon et al, Jour. of Lightware Tech., vol. 13, #5, May 1995, pp. 732–739.
Way et al, Electron. Lett. (UK), vol. 28, #3, pp. 211–213, Jan. 13, 1991; abst. only herewith.
Laming et al, IEEE Photonics Technol. Lett, vol. 3, #3, pp. 253–255, Mar. 1991.
Pavleser et al, SPIE, vol. 1581, 1991, pp. 107–113.

*Primary Examiner*—Nelson Moskowitz
*Attorney, Agent, or Firm*—Brooks Haidt Haffner & Delahunty

[57] ABSTRACT

In an optical amplifier, comprising a rare earth doped optical waveguide, in which signals at signal wavelength and pump power at pump wavelength are coupled together, a differential loss inducing means is located in a predetermined position along the length of the waveguide, causing a loss for the signal greater by a predetermined loss amount than the loss for the pump wavelength, said predetermined loss amount and said predetermined loss position being chosen in a mutual relationship to cause an amplification of lower power input signals, in said signal input power range, greater than the amplification of higher power input signals in said range, by an amount causing a substantially constant output power in a dynamic range of input signals greater than 15 dB.

24 Claims, 8 Drawing Sheets

OPTICAL POWER LIMITING AMPLIFIER

RELATED APPLICATION

One of the inventors named herein is a co-inventor named in U.S. application No. 10,478, filed Jan. 28, 1993, now U.S. Pat. No. 5,260,823 and entitled "Erbium-Doped Fiber Amplifier with Shaped Spectral Gain".

BACKGROUND OF THE INVENTION

Doped fiber amplifiers such as erbium-doped fiber amplifiers (EDFA's) are expected to play a key role in the implementation of high-capacity, high-speed fiber-optic communication networks.

The average output signal power of an EDFA increases monotonically in a non-linear manner with the average input signal power.

The roll-over in the input/output characteristics of the EDFA is due to gain saturation effects. This is a desirable feature providing a weak (soft) optical limiting of the output power for a wide range of input signals.

However, in a variety of applications, it is imperative for the output signal power of the amplifier to be always constant (hard limiting) at particular points of the optical network. In these cases, the generic saturation non-linearity of the EDFA is not sufficient to limit the amplifier output power.

This task is accomplished by an EDFA with special input-output characteristics, called optical power limiting amplifier (OLA). The output signal powers remains substantially constant (i.e. varies less than ±0.5 dB) over a range of input signal power, called the dynamic range of the OLA. In addition, a hard limiting amplifier will be useful in reducing the dynamic range requirements for the electronic and optical components in the network.

Optical power limiting amplifiers are known from W. I Way et al., in Electronics Letters, Jan. 31, 1991, vol. 27, no. 3, pp. 211–213, and in Journal of Lightwave Technology, vol. 10, no. 2, February 1992, pp. 206–214.

In the first paper a limiting optical amplifier has been demonstrated using three cascaded stages of erbium doped fiber amplifiers, each pumped with respective pump sources arranged to counterpropagate with respect to the signal; a Fabry-Perot filter is placed between first and second stages and an angle tuned Fabry-Perot etalon is placed between the second and the third stages.

An optical isolator is placed after each stage of amplifier to avoid optical reflections.

In the second paper an OLA was built using two cascaded stages of fiber amplifiers, two optical isolators and two optical bandpass filters.

Both the above solutions make use of filtering means located after the amplifier, or after each stage of amplifier; the filters introduce relevant overall loss in the signal, of about 9–12 dB.

The optical isolators are used after the end of each amplifier and are used to avoid optical reflections.

In EP 93300762.7 and in Proceedings of Optical Amplifier Topical Meeting, Santa Fe, N.M., June 1992, Paper FB2, pp. 162–165, it is disclosed the use of an isolator inserted within two lengths of erbium doped fiber of an optical amplifier, to the purpose of reducing the backward travelling amplified spontaneous emission (ASE); the optimum isolator position range is found at 30%=15% of the total EDFA length.

In U.S. Pat. No. 5,050,949 a multi stage optical fiber amplifier is shown, which provides gain spectrum equalization for channels at different wavelengths, by means of a two stage fiber amplifier with two doped fiber compositions, to obtain, for each stage, a different gain spectrum; an optical isolator is introduced between the two stages to suppress reflection induced noise and spontaneous emission.

In this amplifier no power limiting effect is shown at a single signal wavelength.

In EP 0 470 497 an optical fiber amplifier is shown, where a coil-formed erbium doped optical fiber is used, with a radius of curvature set such that the bend loss caused on the signal light with the wavelength 1.536 μm is small, while the bend loss caused on the light generated by erbium spontaneous emission, with the wavelength 1.55 μm, is great; the preferred bend radius is 20 mm and the gain markedly decreases when the radius of curvature is 13 mm or below.

No power limiting effect is shown at the signal wavelength and no differential loss is taught between signal and pump light.

SUMMARY OF THE INVENTION

According to the present invention it has been found that an optical power limiting amplifier can be made by causing a concentrated loss for the signal wavelength within the length of the doped optical waveguide or fiber of the amplifier, if the loss value and position along the waveguide is properly selected according to a predetermined relationship, such that a nearly constant output power is obtained in an input signal power range greater than 15 dB.

In a first aspect of the invention, an optical amplifier, comprising:
a rare earth doped optical waveguide;
signal input means, receiving a signal at signal wavelength, in a signal input power range;
pumping means supplying pump power at pump wavelength;
coupling means for coupling said signals and pump power in the rare earth doped waveguide;
signal output means, emitting output signals amplified at output power by stimulated emission of said rare earth pumped in said waveguide,
is characterized in that a differential loss inducing means, causing a loss for the signal greater by a predetermined loss amount than the loss for the pump wavelength, is located in a predetermined position along the length of the waveguide, said predetermined loss amount and said predetermined loss position being chosen in a mutual relationship to cause an amplification of lower power input signals, in said signal input power range, greater than the amplification of higher power input signals in said range, by an amount causing a substantially constant output power in a dynamic range of input signals greater than 15 dB.

Preferably the waveguide comprises a rare earth doped optical fiber.

Preferably the waveguide is doped with erbium.

In a preferred embodiment, said predetermined loss amount is greater than 2 dB, and more preferably greater than 3 dB.

Said predetermined position along the length of the waveguide is comprised between 50 and 75% of the total rare earth doped wavelength length.

According to a preferred aspect of the present invention, said mutual relationship between said predetermined loss amount and said predetermined loss position includes a loss amount increase with increasing of the position value along the waveguide.

Preferably, at least part of the pump power is supplied for propagation in the same direction of the signal within the rare earth doped optical waveguide.

In a preferred embodiment of the invention said differential loss inducing means consists in a coil of one or more loops of an optical fiber, having a predetermined radius, optically coupled to said waveguide.

In particular, said differential loss inducing means consists in a coil of one or more loops of an optical fiber, having a predetermined radius, optically coupled to said rare earth doped optical fiber.

Preferably said coil-is formed by one or more loops of the same rare earth doped optical fiber.

Preferably said predetermined loop radius is a radius smaller than a radius at which the propagation mode of the signal wavelength within the fiber experiences a loss greater than 0.1 dB per loop.

Preferably said optical fiber is single-mode at pump wavelength.

More preferably, said optical fiber has a cut-off wavelength comprised between 800 and 950 nm, and the pump wavelength is 980 nm.

In a second preferred embodiment of the invention said differential loss inducing means comprises an optical isolator.

In a third preferred embodiment of the invention said differential loss inducing means comprises by-pass means effective for the pump wavelength.

In an embodiment of the invention said coupling means for coupling said signals and pump power in the rare earth doped waveguide comprises a wavelength division multiplexer, having an input connected to a pumping source.

In particular said coupling means for coupling said signals and pump power in the rare earth doped waveguide comprises a wavelength division multiplexer, having a first input connected to a pumping source, a second input connected to a signal source and an output, where signal and pump power are coupled together, connected to said waveguide.

In alternative said coupling means for coupling said signals and pump power in the rare earth doped waveguide comprises a first wavelength division multiplexer, connected to a first end of said waveguide, and a second wavelength division multiplexer, connected to a second end of said waveguide, for bidirectional pumping thereof.

Preferably the differential loss inducing means is concentrated in less than 10% of the total waveguide length.

In a further embodiment of the invention the differential loss inducing means comprises a first differential loss inducing means, located after a first waveguide portion in the signal propagating direction along the waveguide, and a second differential loss inducing means, separed by an intermediate waveguide portion from said first differential loss inducing means, said first differential loss inducing means comprising an optical isolator.

Preferably at least the differential loss amount due to the second differential loss inducing means is higher than 2 dB.

Preferably the length of the first waveguide portion is comprised between 15 and 45% of the total waveguide length.

Preferably the sum of the lengths of the first waveguide portion and of the intermediate waveguide portion is at least 50% of the total waveguide length.

An optical power limiting amplifier in accordance with the present invention comprises a doped optical waveguide into which, in use, a pump and a signal are introduced; and differential loss inducing means for introducing a differential loss between the pump and the signal at least one point along the length of the wave guide so as to provide optical limiting.

The invention enables a doped optical amplifier to be fabricated with a dynamic range in excess of 25 dB with the additional capacity of optical control of the constant-output signal power.

The differential loss inducing means may comprise a lump-loss mechanism implemented, for example, in the case where the wave guide is fabricated from an optical fiber, by tightly coiling the fiber at one or more discreet positions.

Alternatively, the lump-loss mechanism could be implemented by an isolator, that is a component which only permits the transmission of optical power in one direction.

The use of an isolator has the additional advantage of causing a differential loss between the forward and backward propagating ASE by blocking the backward ASE. This leads to superior performance.

The optical wave guide may be doped with a rare earth element, preferably erbium, although other dopants such as transition metals may also be appropriate.

Preferably, the amplifier further comprises at least on wavelength-division-multiplexing coupler whose output is connected to the wave guide and whose inputs are connected to pump and signal sources respectively. In a further arrangement, wavelength-division-multiplexing couplers may be provided at each end of the fiber to enable bi-directional pumping to be employed.

BRIEF DESCRIPTION OF THE DRAWINGS

Some examples of amplifiers in accordance with the present invention will now be described with reference to the accompanying drawings, in which.

DETAILED DESCRIPTION OF THE INVENTION

Figure 1:
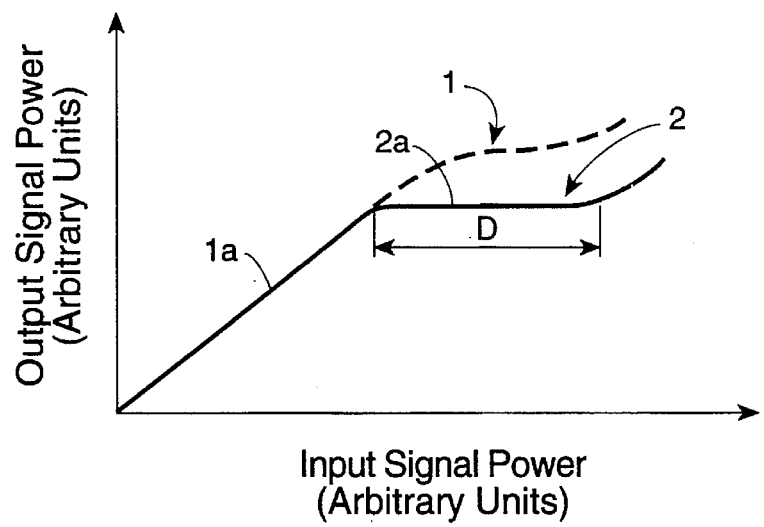
FIG. 1 illustrates the transmission characteristics of a conventional EDFA and OLA.

The input-output signal response of an optical amplifier is shown in FIG. 1 with the curve 1, partially dotted. As apparent from the figure, the output power (represented in arbitrary units) increases substantially linearly for a first portion 1a (continuous line) of the curve 1 with the input power, while when the input signal power is increased after a certain value the output power increases monotonically, in non-linear manner, due to gain saturation effects which provide a soft limiting effect of the output power.

In many applications, however, a constant output power is required (hard limiting), according to the full line 2 of FIG. 1, in a wide range of input signal power.

As shown in the figure, the line 2 has a substantially constant portion 2a, in which the output power varies less than ±0.5 dB in response to the input power increase within the range "D" of input signal power.

The range D of input signal power of the above defined portion 2a of the amplifier response is called "Dynamic Range" of the optical power limiting amplifier.

The dynamic range obtained through the invention is greater than 15 dB, and preferably greater than 20 dB.

Figure 2:
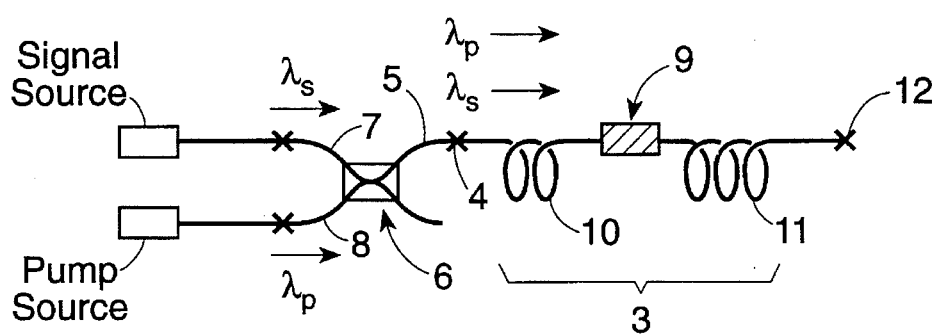
FIG. 2 illustrates a general structure of a first embodiment of an OLA according to the invention, with unidirectional pumping and a single lump-loss mechanism.

Amplifiers according to the invention have been made with the general structure shown in FIG. 2 and comprised a length of erbium doped optical fiber, generally indicated with 3, connected at one end 4 to the output fiber 5 of a wavelength-division-multiplexing coupler 6, whose input fibers 7, 8 are connected to signal and pump sources S and P respectively, having respective wavelengths λs and λp.

Output power limiting action of the amplifier was accomplished by the introduction of a lump-loss mechanism 9 within the optical fiber length, which introduced a loss in the signal after a travel along a first optical fiber portion 10; in contrast, the pump is allowed to propagate along the whole length of the erbium doped fiber 3 with no or minimal additional losses. Thus, the lump-loss 9 provided a differential loss between the pump and signal power.

After a second optical fiber portion 11, the signal was extracted and monitored at the erbium doped fiber output end 12.

In the practical use of the amplifier the signal source can be replaced by an upstream telecommunication optical fiber of an optical telecommunication line, carrying the signal to be amplified, while a downstream fiber of an optical telecommunication line or an optical receiving apparatus can be connected to the fiber output end 12.

In all the following examples, the pump wavelength was about 980 nm and the signal wavelength is about 1–53 μm. The parameters used in the experiments and in the theoretical calculations are set out in Table 1 below.

EXAMPLE 1

Figure 3:
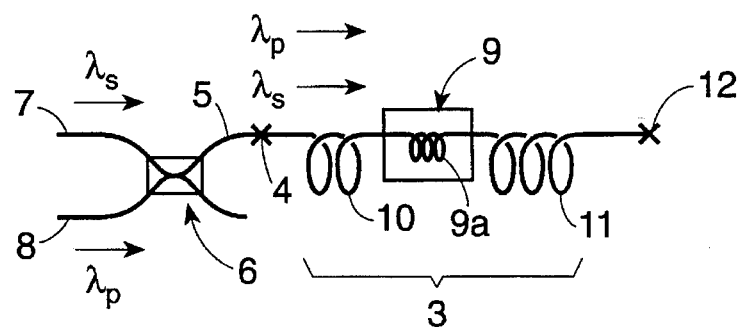
FIG. 3 illustrates an example of an amplifier according to FIG. 2, where the lump-loss is obtained by a fiber coil.

In a first experiment, an amplifier was made according to the structure generally shown in FIG. 2, and the lump-loss mechanism 9 was obtained by means of a fiber coil 9a, as shown in FIG. 3.

The erbium doped fiber was coiled with 10 loops having radius 5 mm, and the resulting loss was 3 dB at the signal wavelength and 0 dB at the pump wavelength.

The first erbium doped fiber portion 10 had a length of 37.5 m, while the second erbium doped fiber portion 11 had a length of 22.5 m, so that the overall length of the erbium doped fiber 3 was 60 m and the lump-loss mechanism was located at 62.5% of the fiber length.

The pump power, supplied by a pump source made by a laser diode, was 20 mW.

Figure 8:
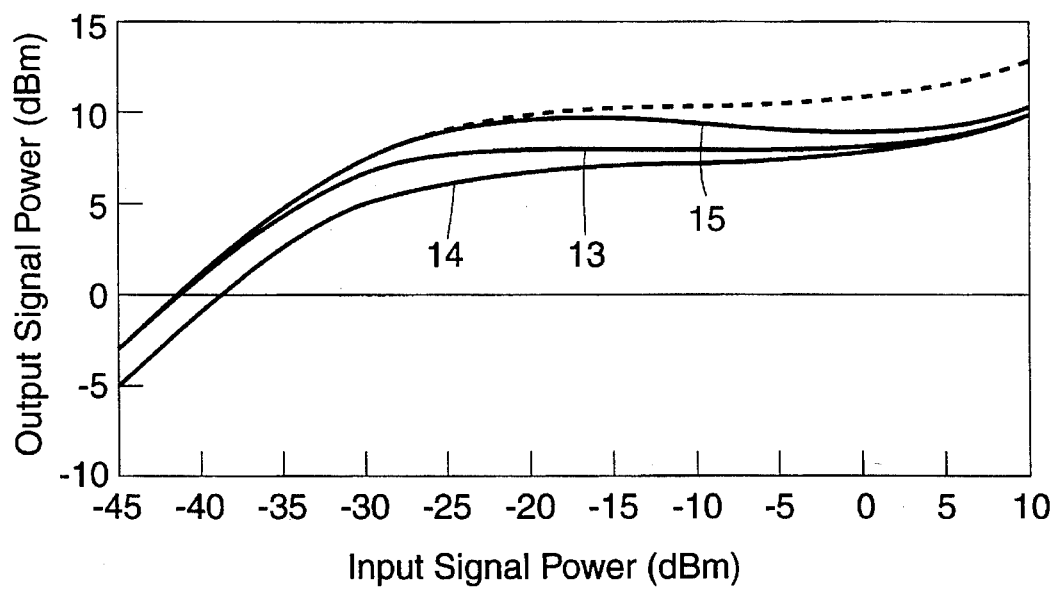
FIG. 8 illustrates the input-output characteristics of an OLA according to the invention from various positions of the lump-loss in which the-input pump power is 20 mW and EDFA has a length of 6 m.

The output power of the amplifier was measured at the fiber end 12 and the result is represented by the curve 13 of FIG. 8.

As shown in the figure, a constant gain range was observed, with a dynamic range of about 20 dB.

The same results have been obtained by calculation with an erbium doped fiber having $Er^{3+}$ concentration of $10^{25} m^{-3}$, with 60 m overall length, where the lump loss had been located after 37.5 m of fiber; the remaining parameters were the same.

EXAMPLE 2

An amplifier was made with the same structure of the Example 1, but the lump-loss mechanism was located after a first portion 10 having length 55 m, with the same overall fiber length of 60 m, corresponding to 91% of the whole fiber length (normalized length 0.91).

The output response is represented in FIG. 8 with the curve 14.

As shown by the figure, no constant output power range was observed.

EXAMPLE 3

An amplifier was made with the same structure of the Example 1, but the lump-loss mechanism was located after a first portion 10 having length 20 m, with the same overall fiber length of 60 m, corresponding to 33% of the whole fiber length (normalized length 0.33).

The output response is represented in FIG. 8 with the curve 15.

As shown by the figure, substantially no constant output power range was observed.

EXAMPLE 4

An amplifier was made with the same structure of the Example 1, where the lump-loss mechanism was located in the middle of the erbium doped fiber, having 60 m overall length.

The amplifier has been tested with various input pump powers, keeping the position and strength of the lump loss unchanged.

By increasing the input pump power from 20 mW to 60 mW the signal output of the OLA was found to increase from about 8 dBm to about 14 dBm. In addition, the dynamic range of the OLA increases by about 5 dB.

Figure 9:
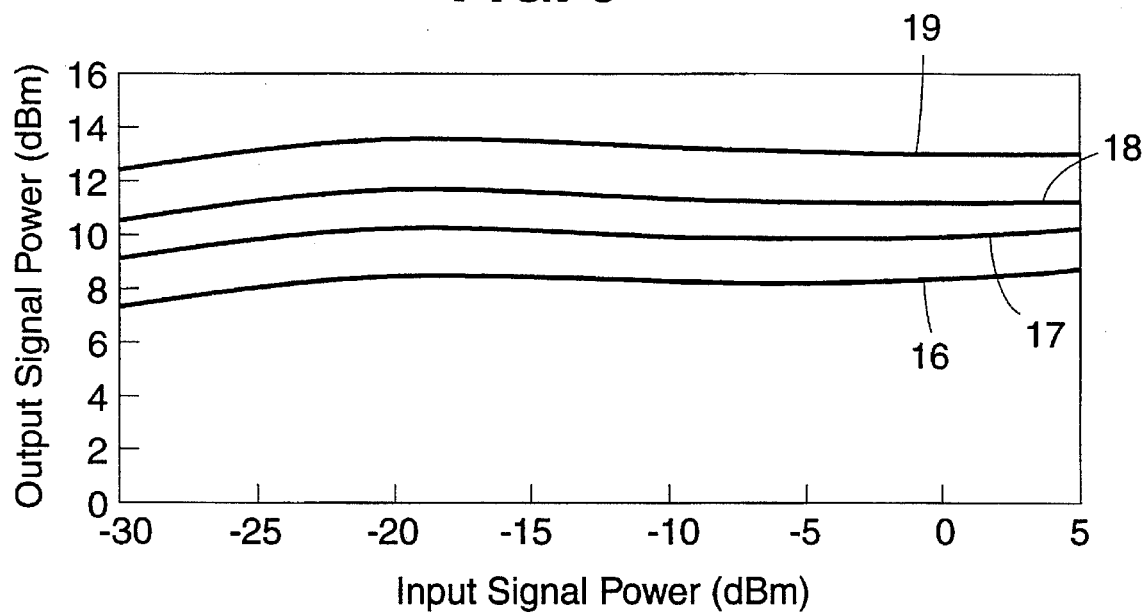
FIG. 9 illustrates the input-output signal response of an OLA pumped uni-directionally by 30 mW, 40 mW, and 60 mW pump power respectively, wherein the lump-loss of the signal forward- and backward-ASE is 3 dB and the pump loss 0 dB.

The measured output power of the amplifier is shown in FIG. 9 with the curves 16, 17, 18, 19 corresponding to 20 mW, 30 mW, 40 mW and 60 mW pump power respectively.

EXAMPLE 5

Figure 5:
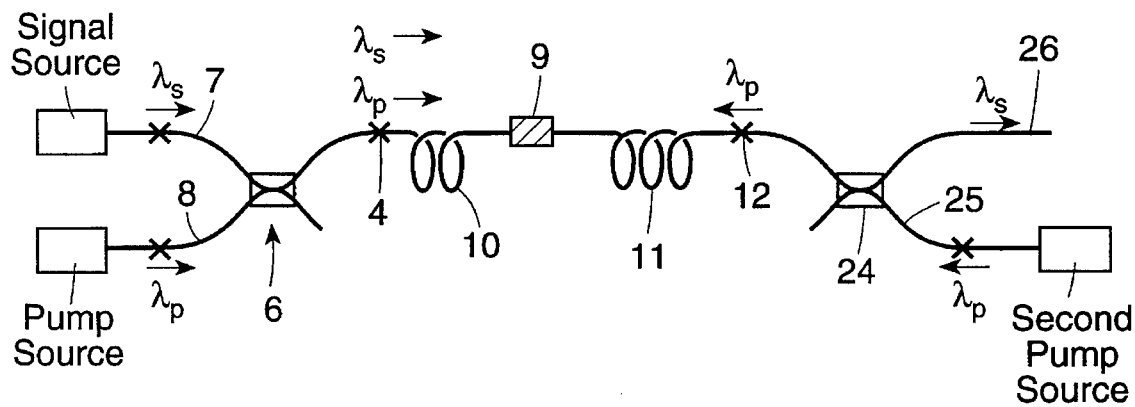
FIG. 5 illustrates a second embodiment of an OLA according to the invention, with bidirectional pumping.

FIG. 5 illustrates a modified experiment, in which a second wavelength-division-multiplexing coupler 24 is connected to the end 12 of the optical fiber 1, having a fiber 25 connected to a second pump source P', so that the pump is also input from the end 12 into the fiber, while the output signal is extracted from the fiber 26 of the coupler.

Figure 10:
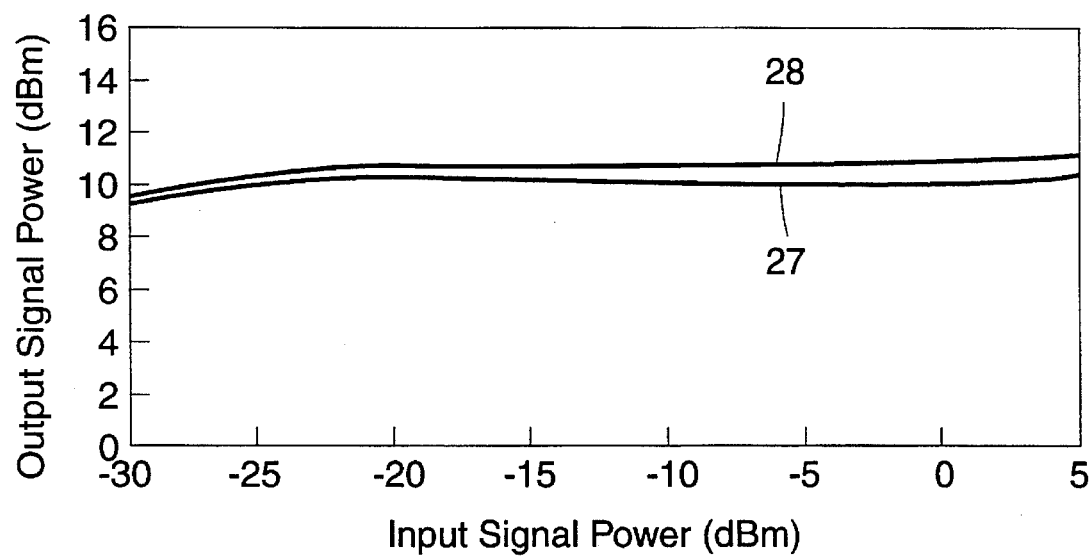
FIG. 10 illustrates the input-output signal response of an OLA pumped uni-directionally and bi-directionally respectively by 30 mW total pump power, the lump loss of the signal, forward- and backward-ASE being 3 dB and the pump loss being 0 dB.

In FIG. 10, curves 27 and 28 correspond to the input-output signal response of the OLA for uni- and bi-directional pumping, respectively. In both cases the total pump power is 30 mW. In the bi-directional case (curve 28), the front and far end of the OLA are illuminated with 20 mW and 10 mW of pump power. The hi-directional pumping also results in an increase of the output signal power of 1 dB and much flatter response over the entire dynamic range.

Figure 4:
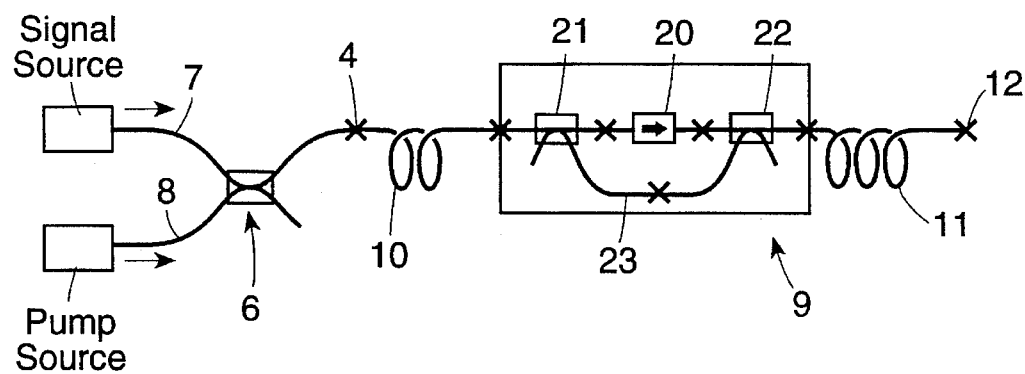
FIG. 4 illustrates an example of an amplifier according to FIG. 2, where the lump-loss is obtained by an optical isolator.

An amplifier with the structure generally represented in FIG. 2 can also be made using an optical isolator 20 for obtaining the lump-loss mechanism 9, as shown in FIG. 4: the optical isolator is a component which only permits the transmission of optical power in one direction only, and introduces a loss in the signal.

Optical isolators are commercial and known in the art and accordingly not described in further detail.

The pump power is permitted to bypass the isolator with minimum loss by the couplers 21, 22 and the by-pass fiber 23.

The signal loss caused by the isolator can be 3 dB, comprehensive of the attenuations caused by the couplers, while the loss in the pump power caused by the couplers and splices can be less than 0.5 dB.

With the same location of the lump-loss mechanism 9 as in the Example 1 a similar input-output response is to be expected.

Such a construction has the advantage that the Noise Figure of the amplifier is reduced by more than 1 dB in comparison with the construction of the experiment of Example 1.

The Noise Figure is defined as $NF=(S/N)_i/(S/N)_o$, where $(S/N)_i$ and $(S/N)_o$ mean the signal/noise -ratio, measured at the input and at the output of the amplifier, respectively.

From the preceeding it follows that the use of an isolator for obtaining the power limiting effect has the advantage of causing a differential loss between the forward and backward propagating ASE by blocking the backward ASE and thereby reducing the noise in the amplifier, even if the position to be selected for an isolator in order to obtain the desired limiting action is outside the isolator position range suitable for obtaining a valuable low Noise Figure in the amplifier, which has been found to be 15–45% of the amplifier fiber length, as disclosed in the previously cited patent application EP 93300762.7.

EXAMPLE 6

Figure 6:
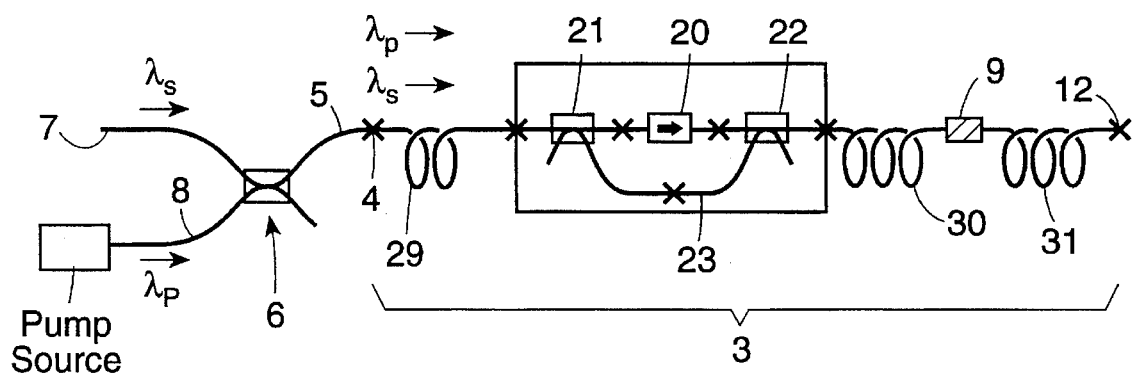
FIG. 6 illustrates the structure of a third embodiment of an OLA according to the invention, with unidirectional pumping and a double lump-loss mechanism.

FIG. 6 illustrates a further experiment in which an optical isolator 20 and relative couplers and bypass fiber 21, 22, 23 for the pump power, was inserted between a first erbium doped fiber portion 29 and a second erbium doped fiber portion 30; a differential loss mechanism 9, formed by a fiber coil, was inserted between the second fiber portion 30 and a third erbium doped fiber portion 31.

First, second and third fiber portions 29, 30, 31 form together the erbium doped fiber 3 of the amplifier, having the signal input end 4 and the signal output end 12.

The signal was supplied to the input fiber 7 of the coupler 6 and the pump power was supplied by the pump source P to the fiber 8 of the coupler 6, whose output fiber was spliced to the input end 4 of the erbium doped fiber 3.

The output signal was extracted and monitored at the output end 12 of the erbium doped fiber 3.

The total erbium doped fiber length was 80 m, the first fiber portion 29 had a length of 15 m, and the second fiber portion had a length of 40 m.

The loss due to the isolator 20 was 1 dB for the signal power and 0.5 dB for the pump power.

The loss due to the differential loss mechanism 9 (fiber loops) was 3 dB for the signal power and 0 dB for the pump power.

The erbium doped fiber 3 had a Numerical Aperture NA=0.24, and the remaining fiber properties are the ones listed in Table 1.

The pump power was 50 mW.

Figure 17:
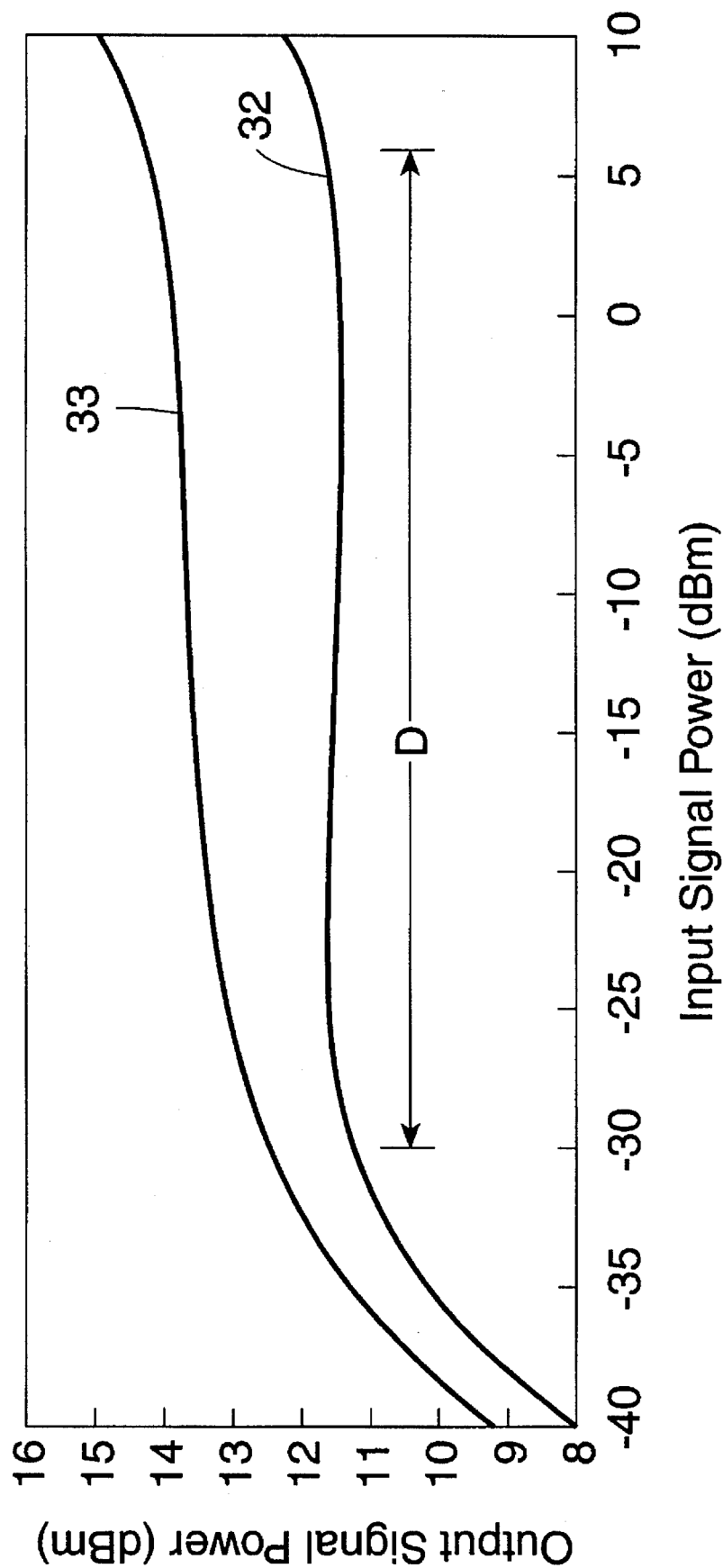
FIG. 17 illustrates the input-output signal response of the OLA of FIG. 6.

The amplifier response is reported in FIG. 17, with the curve 32.

The curve 33 of FIG. 17 is relating to an amplifier using the same erbium doped fiber, having a total length of 80 m, where an isolator was located after a first fiber portion of 35 m, i.e. at 43% of the total length, within the range of the already cited Patent Application EP 93300762.

The differential loss due to the isolator was 1 dB for the signal power and 0–5 dB for the pump power; the pump power was 50 mW.

From FIG. 17 it is apparent that the amplifier of FIG. 6 (curve 32) has a useful dynamic range D, where the output power is substantially constant (=0.5 dB), ranging about 35 dB, while the curve 33 shows a continuous output signal power increase in response to the input signal power, with no useful dynamic range (the output power increases more than 0.5 dB in correspondence of an increase of input signal power of less than 15 dB).

Figure 7:
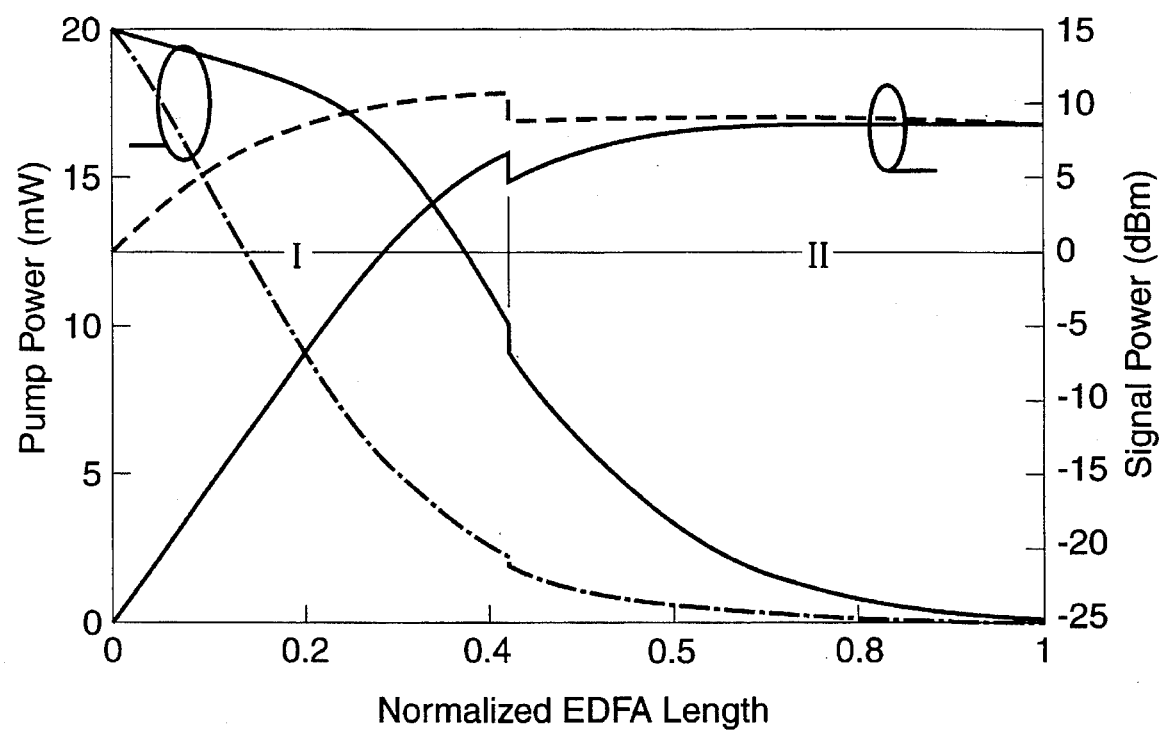
FIG. 7 illustrates the variation in pump and signal power evolution along the length of the OLA for two extreme input signal powers of $-25$ dBm and 0 dBm and input power of 20 mW.

The underlying principle of operation of the power limiting amplifier of the invention is explained with reference to FIG. 7, where the pump and signal evolution along the normalised fiber length is shown for the two extreme input signal powers of −25 dBm and 0 dBm, drawn with continuous and dotted lines respectively. The pumping is uni-directional (FIG. 2) with input pump power of 20 mW. The limiting action is achieved by the fine balance between the pump and amplified-signal power in stage I and II (corresponding to the first and second fiber portions 10, 11 respectively), before and after the lump-loss position, respectively.

In stage I, both signals are amplified with the high-input-power (0 dBm) signal attaining higher levels than the low-input-power (−25 dBm) one, as expected. However, the pump power is depleted at a slower rate by the low-input-power signal and there is sufficient remnant pump power available in stage II to amplify the attenuated low-input signal to the same level with the high-input signal.

The high-input-power signal, on the other hand, depletes heavily the pump power to very low levels in stage I. Towards the end of stage II, the pump power drops below threshold and the signal is slightly attenuated to level-off with the low-input-power one. The signals of intermediate input power evolve in an analogous manner and converge the same output level.

The same principle of operation applies in the case of bi-directional pumping (FIG. 5).

It has to be observed that, according to the present invention, the power limiting effect in the amplifier is obtained preferentially when at least part of the pump power is supplied in the same direction of the signal, and a sufficient pump power level is present in the fiber at the lump-loss location to contribute to the amplification of the low-input-power signals in the amplifier dynamic range.

As already mentioned, the limiting action of the proposed OLA relies on a balance between the relative remnant pump and signal power at the position of the lump-loss.

Therefore, it is expected that the amount and the relative position of the lump-loss alone the fiber length affects the transmission characteristics and dynamic range of the OLA.

In FIG. 8, the input-output signal power characteristics of the proposed OLA are shown for various lump-loss positions. The induced signal and pump losses are 3 dB and 0 dB, respectively, which can easily be achieved by coiling the fiber, for example. The input pump power is 20 mW and the total EDFA length 60 m. It is clearly shown that the best response of the OLA is achieved when the lump-loss is placed 37.5 m from the input end of the EDFA.

The no-loss case is also plotted on the same Figure for comparison (dotted line).

An important feature of the proposed OLA is the possibility of controlling the output signal power optically by varying the input pump power.

In FIG. 9 the input-output signal response of the OLA is shown, obtained with unidirectional pumping and various input powers.

A lump-loss (3 dB for the signal, backward and forward ASE and 0 dB for the pump) is placed in the middle of a 60 m long EDFA. By increasing the input power from 20 mW to 60 mW, the signal output of the OLA increases from about 8 dBm to about 14 dBm. In addition, the dynamic range of the OLA increases by about 5 dB. The position and strength of the lump loss is unchanged.

In the case where hi-directional pumping is employed (FIG. 5), the response of the OLA is further improved, as shown in FIG. 10.

The differential lump-loss caused by a fiber loop is due to the fact that in a fiber single-moded at both signal and pump wavelength, and particularly when the pump wavelength is about 980 nm and signal wavelength is about 1.53 μm, the pump light has a wavelength λp which is close to the cut-off wavelength λc, which is the wavelength below which, in addition to $LP_{01}$ fundamental mode, higher order modes are guided within the fiber, while the signal wavelength is far from the same cut-off wavelength λc.

Preferably, with the above indicated pump and signal wavelengths, the cut-off wavelength λc is chosen between 800 and 950 nm.

In this condition the pump power is well confined within the fiber core and substantially no escape is permitted even if the fiber is bent with a small radius.

The signal wavelength, in turn, is far from the cut-off wavelength and a higher proportion of the field is propagating within in the fiber cladding, so that in presence of a bend the mode may be no more guided within the fiber, causing a power loss.

Figure 11:
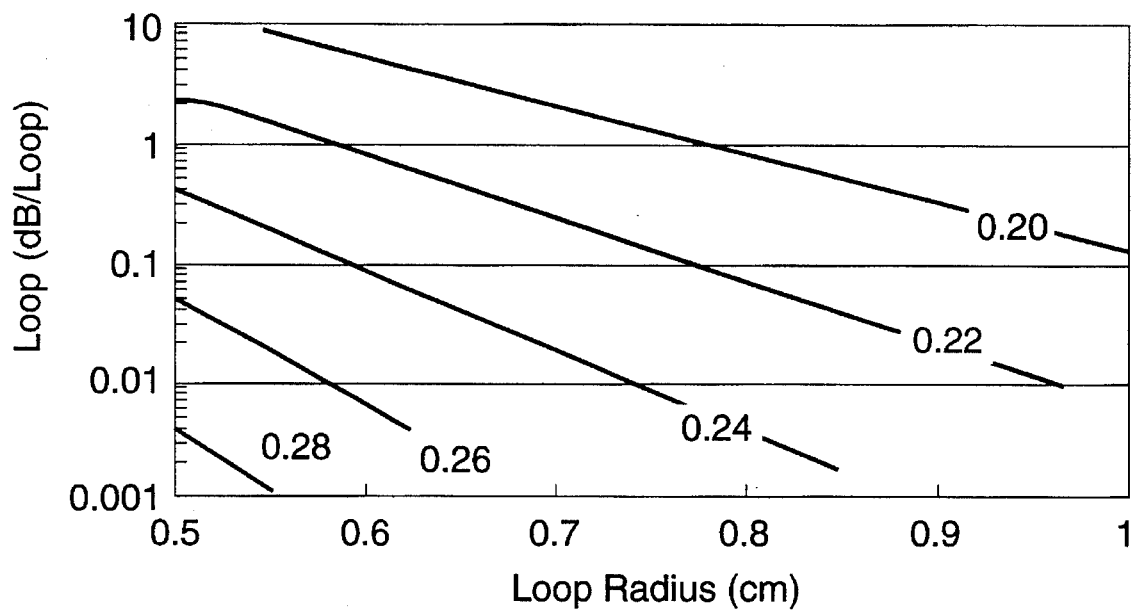
FIG. 11 illustrates the relationship between loss and loop radius at various fiber NA, when the loss is obtained by tight coiling the fiber.

The phenomenon depends on the Numerical Aperture NA of the fiber and on the loop radius; the relationship between loss (dB/loop) and loop radius is shown in FIG. 11 for various fiber NA.

The fiber NA is defined as:

$$NA=(n_1^2-n_2^2)^{1/2}$$

where $n_1$ is the refractive index of the cope and $n_2$ is the refractive index of the cladding.

As it is apparent from the figure, the fiber with NA=0.24 used in the experiments required about 10 loops with radius 0.5 cm to achieve the desired loss of 3 dB.

Similarly, with NA–0.2 the same loss of 3 dB at the signal wavelength can be obtained with about 20 loops with radius 1 cm, or 3 loops with radius 0.8 cm.

The loops can be made with the same erbium doped fiber 3 of the amplifier, or by means of a different fiber portion inserted between the two portions 10, 11 and coiled with the required loop radius and number of loops.

The FIGS. 12 to 16 report the responses of an OLA with various loss values and different normalized positions along the erbium doped fiber, between 0.2 (upper curves) and 0.9 (lower curves), derived and evaluated on the basis of the above experiments.

Figure 12:
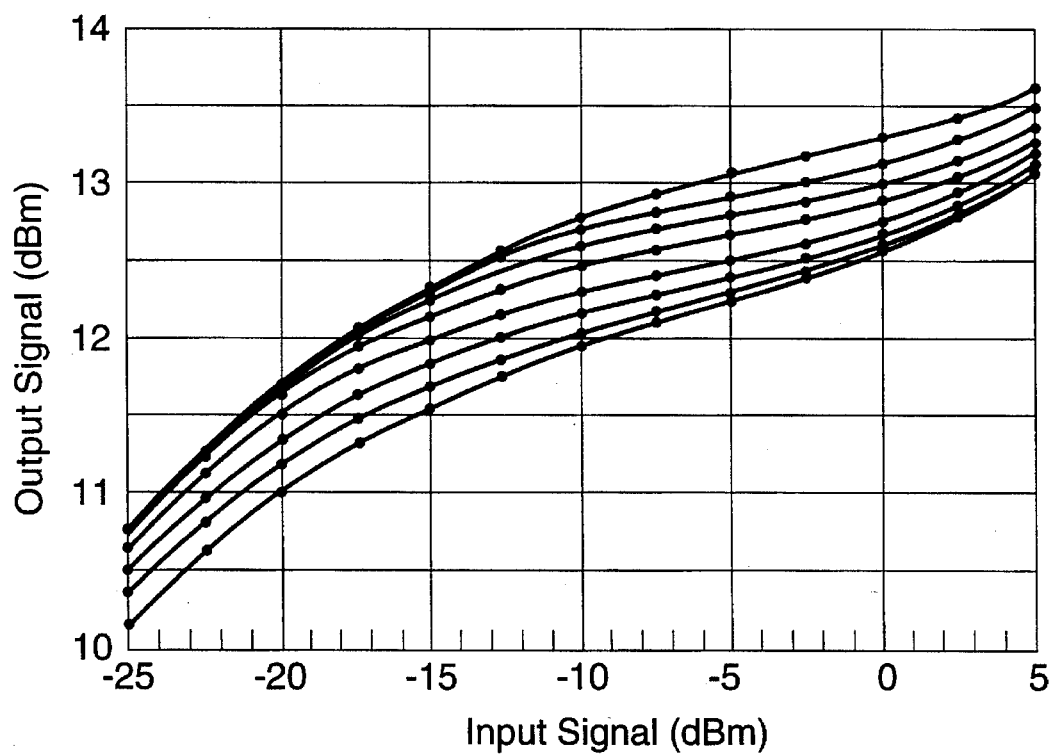
FIG. 12 illustrates the input-output signal response of an OLA when the lump-loss of the signal is 1 dB and the pump loss 0 dB, at various positions along the fiber.
Figure 13:
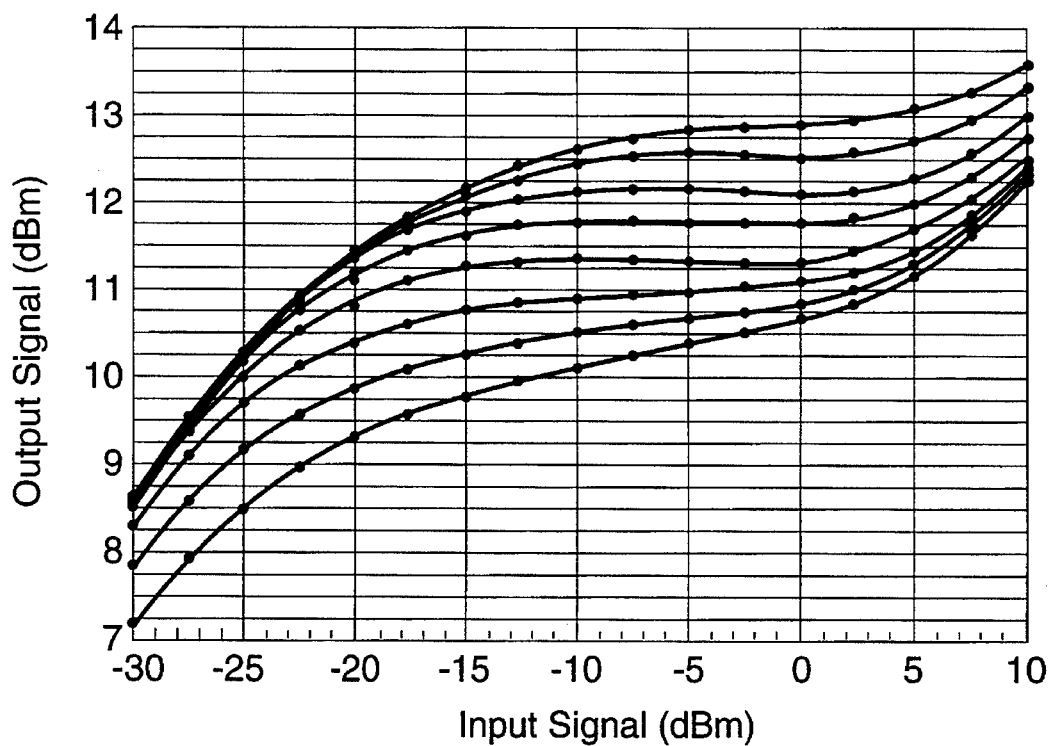
FIG. 13 illustrates the input-output signal response of an OLA when the lump-loss of the signal is 2 dB and the pump loss 0 dB, at various positions along the fiber.
Figure 14:
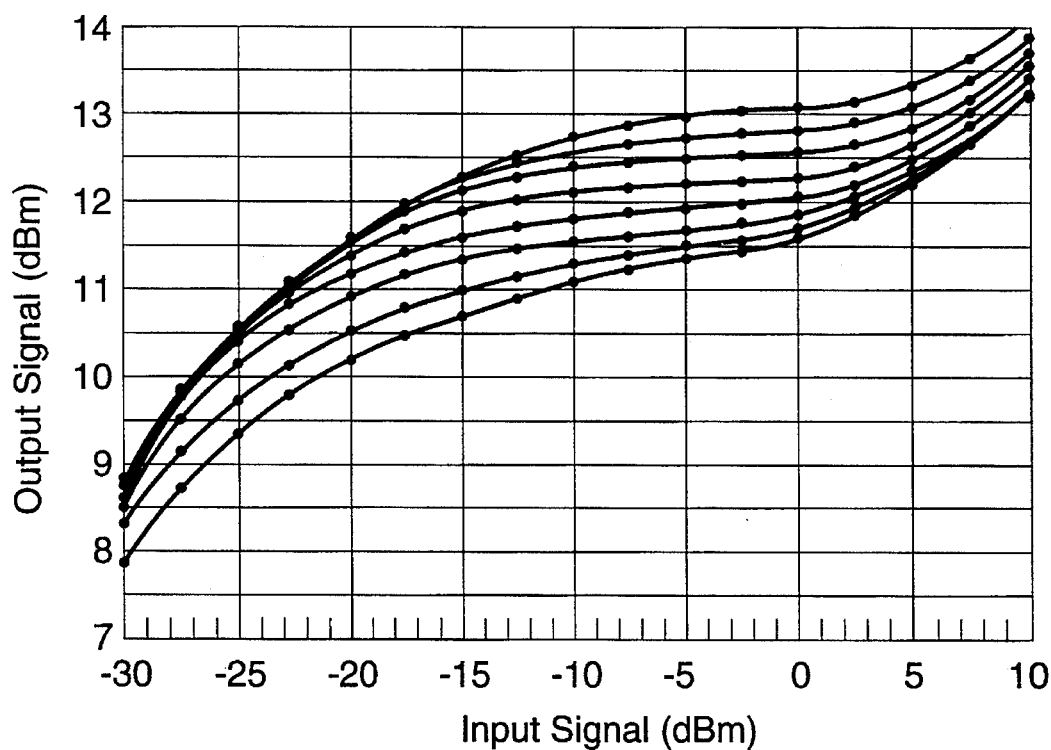
FIG. 14 illustrates the input-output signal response of an OLA when the lump-loss of the signal is 3 dB and the pump loss 0 dB, at various positions along the fiber.
Figure 15:
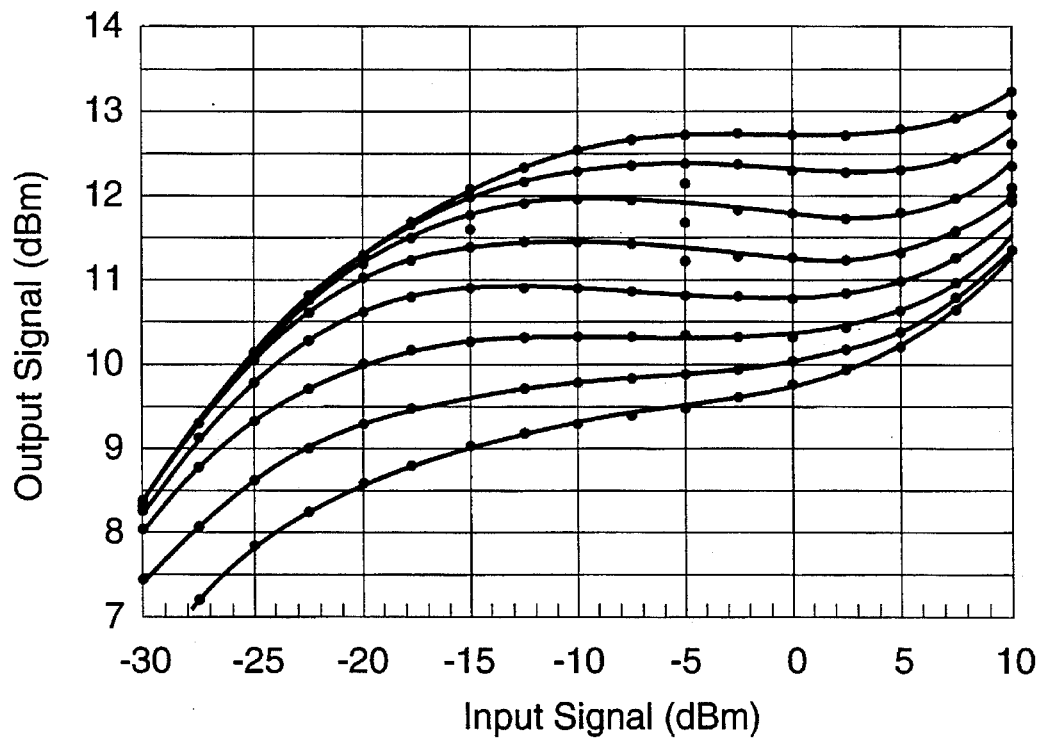
FIG. 15 illustrates the input-output signal response of an OLA when the lump-loss of the signal is 4 dB and the pump loss 0 dB, at various positions along the fiber.
Figure 16:
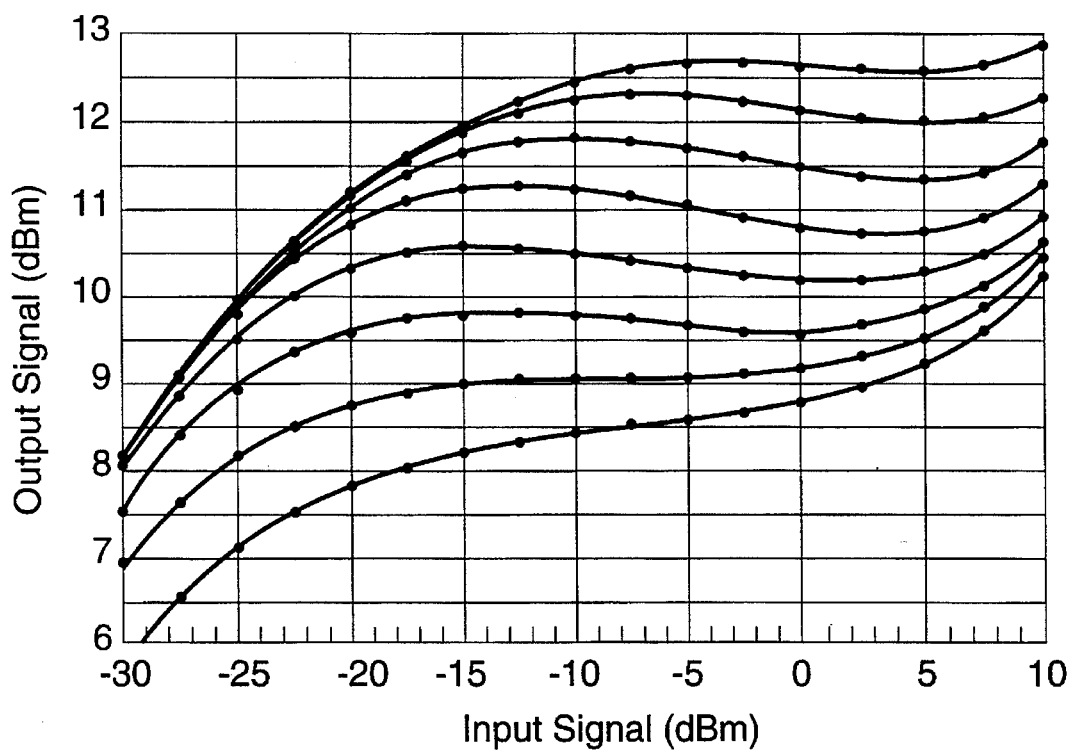
FIG. 16 illustrates the input-output signal response of an OLA when the lump-loss of the signal is 5 dB and the pump loss 0 dB, at various positions along the fiber.

In particular, FIG. 12 contains the curves representing the amplifier response for 1 dB differential loss between signal and pump powers; FIG. 13 contains the curves representing the response for 2 dB differential loss; FIG. 14 contains the curves representing the response for 3 dB differential loss; FIG. 15 contains the curves representing the response for 4 dB differential loss and FIG. 16 contains the curves representing the response for 5 dB differential loss.

From the above diagrams it is apparent that the value of the differential loss, the location of the loss and the resulting dynamic range are related together.

In particular, while −1 dB differential loss has shown to be unsatisfactory for obtaining a valuable limiting effect, a 2 dB loss located at 50% of the erbium doped fiber length provided a 15 dB dynamic range.

With greater differential loss (3 to 5 dB) the dynamic range has been found to increase, up to 20–25 dB, with increasing optimum normalized position.

Furthermore, it has to be observed that a differential loss located before than 50% of the erbium doped fiber length has not been found suitable to produce a valuable output power limiting effect.

Accordingly, in particular, the present invention does not include amplifiers in which the differential loss is caused only by an isolator located at, or before than, 45% of the erbium doped fiber length.

A summary of performance of various OLA with differential lump-loss of different values and in different position is reported in Table 2.

The proposed erbium-doped OLA can be used in various transmission and distribution fiber-optic networks. It can, for example, be utilised as line-, power-, or pre-amplifier in a long-haul system or a subscriber loop where transmission or distribution losses vary along the network.

They can also be used to equalise the unequally received power from the different terminals in a switching network.

The lump-loss facility is most easily achieved by tightly winding the fiber as shown in FIG. 3.

Other conventional ways of achieving lump-loss could also be used.

By way of example, the differential lump-loss can be achieved by a coupler, capable to couple part of the signal wavelength propagating in the fiber in a second fiber, where it is dispersed without returning into the erbium doped fiber, while the pump power is permitted to travel straightforward in the erbium doped fiber without coupling in said second fiber.

Furthermore, although a single lump-loss mechanism has been shown in the examples 1 to 6, it is also possible for there to be more than one lump-loss mechanism, as shown in example 7.

In particular, as shown by the curve 32 of FIG. 17, it is apparent that the combined presence of the isolator 20, which by itself is not sufficient (both for its differential loss value and for its position) to obtain a valuable power limiting effect, with a lump-loss mechanism 9 produces a power limiting amplifier with larger dynamic range in comparison with an amplifier according to the Example 1, where only one lump loss mechanism is used.

In order to obtain the desired effect, the suitable position and differential loss values for the lump-loss mechanism 9 in the embodiment of FIG. 6 are preferably the same as indicated for a single loss mechanism; the preferred differential loss value due to the isolator is greater than 1 dB.

Since the preferred position range for the lump-loss mechanism, used to obtain the power limiting effect, does not interfere with the optimum position range of the isolator used to reduce the Noise Figure, the selection of the corresponding positions in the amplifier can be made without limitations.

In addition, distributed loss can be used, that is a differential loss distributed in a length of the erbium doped fiber instead of a differential loss concentrated in a limited portion of the erbium doped fiber although the response would not be as efficient as with a lump-loss mechanism.

To the purposes of the present description a differential loss is considered "concentrated" when it is extended for less than about 10% of the total fiber length; such is the case when the differential loss is obtained through a number of small radius fiber loops.

By way of example, the coil of 10 loops of 0.5 cm radius of Example 1 uses about 30 cm of fiber, which amounts to 0.5% of the total fiber length of 60 m.

TABLE 1

Typical values of the various parameters used in the experiments and in the calculation of the performance characteristic of the optical limiting amplifier.

a) Fibre parameters.

| | |
|---|---|
| Numerical Aperture | 0.3 |
| Cutoff wavelength | 835 nm |
| Signal absorption cross-section | $7.9 \times 10^{-25}$ m$^2$ |
| Signal emission cross-section | $6.7 \times 10^{-25}$ m$^2$ |
| Pump absorption cross-section | $2.55 \times 10^{-25}$ m$^2$ |
| Pump emission cross-section | 0 m$^2$ |
| Signal background loss | 0 dB/Km |
| Pump background loss | 0 dB/Km |
| Fluorescence life-time | 12.1 ms |
| ASE equivalent bandwidth | 4.5 nm |
| Er$^{3+}$ concentration | $10^{24}$ m$^{-3}$ |
| Dopant/core ratio ($R_c$) | 1 |

TABLE 1-continued

Typical values of the various parameters used in the experiments and in the calculation of the performance characteristic of the optical limiting amplifier.

b) Pump & signal parameters.

| | |
|---|---|
| Signal wavelength | 1536 nm |
| Pump wavelength | 980 nm |

TABLE 2

Summary of performance of OLA with differential lump loss

| Differential loss (dB) | Normalized Optimum position of loss | Dynamic range (dB) |
|---|---|---|
| 1 | — | — |
| 2 | 0.5 | 15 |
| 3 | 0.6 | 20 |
| 4 | 0.7 | 20 |
| 5 | 0.75 | 25 |

We claim:

1. In an optical amplifier comprising:

an optical waveguide doped with a rare earth and capable of producing stimulated emission of light within a predetermined band of wavelengths and within a predetermined power range and when pumped with light of wavelength λ p, said waveguide having an input end and an output end;

means for introducing pump light at a wavelength λ p into at least one of said input end and said output end; and coupling means for coupling input signals at a predetermined wavelength in said band and at different power levels into said input end of said waveguide, said waveguide providing gain for said signals depending upon the amount of pumping light power along the length of said waveguide wherein the improvement comprises differential loss inducing means intermediate said input end and said output end and spaced from both said input end and said output end which causes a loss for said signals of said predetermined wavelength which is greater by a predetermined amount than the loss for light at said pumping wavelength λ p, said predetermined amount and the spacing of said loss inducing means from said input end and said output and being selected to cause amplification of said input signals of lower power than other said input signals and in said power range greater than amplification of said other said input signals of greater than power than said input signals of lower power and in said power range by an amount which produces output signals corresponding to said input signals which are of a substantially constant output power at said output end when the dynamic power range of said input signals introduced into said input end is at least 15 dB.

2. An optical amplifier according to claim 1, characterized in that the waveguide comprises a rare earth doped optical fiber.

3. An optical amplifier according to claim 2, characterized in that the fiber is doped with erbium.

4. An optical amplifier according to claim 1, characterized in that said predetermined loss amount is greater than 2 dB.

5. An optical amplifier according to claim 4, characterized in that said predetermined loss amount is greater than 3 dB.

6. An optical amplifier according to claim 1, characterized in that said differential loss inducing means is spaced from said input end by between 50 and 75% of the total rare earth doped waveguide length.

7. An optical amplifier according to claim 1, characterized in that the relationship between said predetermined amount of loss and said spacing includes a loss amount increase with increasing of the spacing of said loss inducing means from said input along the waveguide.

8. An optical amplifier according to claim 1, characterized in that at least part of the pump power is supplied for propagation in the same direction of the signal within the rare earth doped optical waveguide.

9. An optical amplifier according to claim 1, characterized in that said differential loss inducing means comprises a coil of one or more loops of an optical fiber, having a predetermined radius, optically coupled to said waveguide.

10. An optical amplifier according to claim 2, characterized in that said differential loss inducing means comprises a coil of one or more loops of an optical fiber, having a predetermined radius, optically coupled to said rare earth doped optical fiber.

11. An optical amplifier according to claim 10, characterized in that said coil is formed by one or more loops of the rare earth doped optical fiber which is the same as the waveguide fiber.

12. An optical amplifier according to claim 10, characterized in that said predetermined loop radius is a radius smaller than a radius at which the propagation mode of the signal wavelength within the fiber experiences a loss greater than 0.1 dB per loop.

13. An optical amplifier according to claim 10, characterized in that said optical fiber of said coil is single-mode at pump wavelength.

14. An optical amplifier according to claim 13, characterized in that said optical fiber of said coil has a cut-off wavelength comprised between 800 and 950 nm, and the pump wavelength is 980 nm.

15. An optical amplifier according to claim 1, characterized in that said differential loss inducing means comprises an optical isolator.

16. An optical amplifier according to claim 1, characterized in that said differential loss inducing means comprises by-pass means effective for the pump wavelength.

17. An optical amplifier according to claim 1, characterized in that said coupling means comprises a wavelength division multiplexer, having an input connected to a pumping source.

18. An optical amplifier according to claim 17, characterized in that said wavelength division multiplexer has a first input connected to a pumping source, a second input connected to a signal source and an output, where signal and pump power are coupled together, connected to said input end of said waveguide.

19. An optical amplifier according to claim 17, characterized in that said wavelength division multiplexer, connected to a first end of said waveguide, and further comprising a further wavelength division multiplexer, connected to a second end of said waveguide, for introducing pump light into said second end to provide bidirectional pumping of the waveguide thereof.

20. An optical amplifier according to claim 1, characterized in that the differential loss inducing means is concentrated in less than 10% of the total waveguide length.

21. An optical amplifier according to claim 1, characterized in that the differential loss inducing means comprises a first differential loss inducing means, located after a first waveguide portion in the signal propagating direction along the waveguide, and a second differential loss inducing means, separated by an intermediate waveguide portion from said first differential loss inducing means, said first differential loss inducing means comprising an optical isolator.

22. An optical amplifier according to claim 21, characterized in that at least the differential loss amount due to the second differential loss inducing means is higher than 2 dB.

23. An optical amplifier according to claim 21, characterized in that the length of the first waveguide portion is is between 15 and 45% of the total waveguide length.

24. An optical amplifier according to claim 21, characterized in that the sum of the lengths of the first waveguide portion and of the intermediate waveguide portion is at least 50% of the total waveguide length.

\* \* \* \* \*

UNITED STATES PATENT AND TRADEMARK OFFICE
CERTIFICATE OF CORRECTION

PATENT NO. : 5,579,153
DATED : November 26, 1996
INVENTOR(S) : Laming et al

It is certified that error appears in the above-indentified patent and that said Letters Patent is hereby corrected as shown below:

Col. 2, line 1, change "30%=15%" to --30%±15%--

Col. 4, line 23, change "on" to --one--

Col. 6, line 8, change "1-53" to --1.53--

Col. 8, line 40, change "0-5" to --0.5--

Col. 8, line 45, change "(=0.5 dB)" to --(±0.5 dB)--

Col. 9, line 50, change "hi-directional" to --bi-directional--

Col. 10, line 13, insert a comma (,) after the formula

Col. 12, line 39 should immediately follow "of" in line 38

Col. 14, line 37, cancel "is" (second occurrence).

Signed and Sealed this

Twelfth Day of August, 1997

*Attest:*

*Attesting Officer*

BRUCE LEHMAN

*Commissioner of Patents and Trademarks*